(12) United States Patent
Uchibori

(10) Patent No.: US 11,715,985 B2
(45) Date of Patent: Aug. 1, 2023

(54) STATOR AND MOTOR

(71) Applicant: Nidec Corporation, Kyoto (JP)

(72) Inventor: Tomoki Uchibori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/572,677

(22) Filed: Jan. 11, 2022

(65) Prior Publication Data

US 2022/0231563 A1 Jul. 21, 2022

(30) Foreign Application Priority Data

Jan. 20, 2021 (JP) ................................. 2021-006981

(51) Int. Cl.
*H02K 3/52* (2006.01)
*H02K 1/14* (2006.01)
*H02K 37/12* (2006.01)
*H02K 7/08* (2006.01)

(52) U.S. Cl.
CPC ............. *H02K 3/525* (2013.01); *H02K 1/145* (2013.01); *H02K 7/088* (2013.01); *H02K 37/12* (2013.01); *H02K 2203/06* (2013.01)

(58) Field of Classification Search
CPC ........ H02K 3/525; H02K 5/225; H02K 5/145; H02K 2203/06
See application file for complete search history.

(56) References Cited

U.S. PATENT DOCUMENTS

| 5,325,003 | A | * | 6/1994 | Saval | H02K 13/02 310/263 |
| 5,886,451 | A | * | 3/1999 | Hatsios | H02K 13/02 310/263 |
| 5,955,807 | A | * | 9/1999 | Kajiura | H02K 21/044 310/156.69 |
| 6,013,966 | A | * | 1/2000 | Fehrenbacher | H02K 5/1675 310/257 |

FOREIGN PATENT DOCUMENTS

JP 2012-80668 A 4/2012

* cited by examiner

*Primary Examiner* — Dang D Le

(74) *Attorney, Agent, or Firm* — Keating & Bennett

(57) ABSTRACT

A stator includes a cylindrical shaft extending in an axial direction, annular portions positioned side by side in the axial direction radially outside the shaft and extending in a radial direction, pole teeth extending in the axial direction from a radially outer end portion of each of the annular portions, and one or more coils between the annular portions adjacent to each other in the axial direction and wound around the shaft. The shaft includes at least one slit recessed radially inward from an outer peripheral surface of the shaft and extending along the axial direction. A portion of the at least one slit is radially inside the annular portion. A lead wire of the coil is accommodated in the at least one slit.

20 Claims, 7 Drawing Sheets

[Fig. 1]
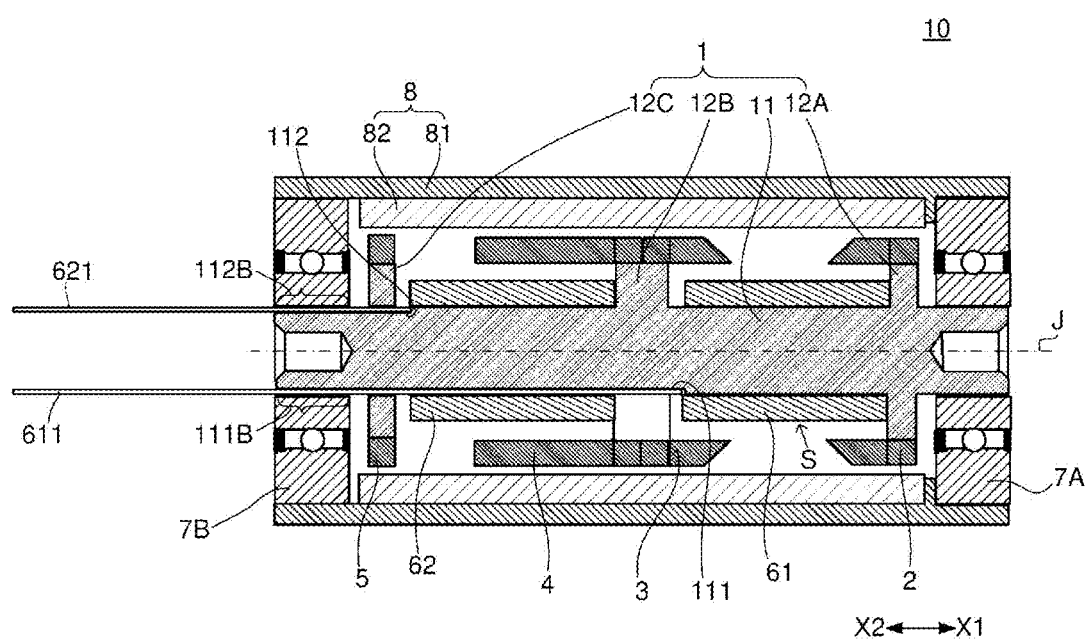

[Fig.2]
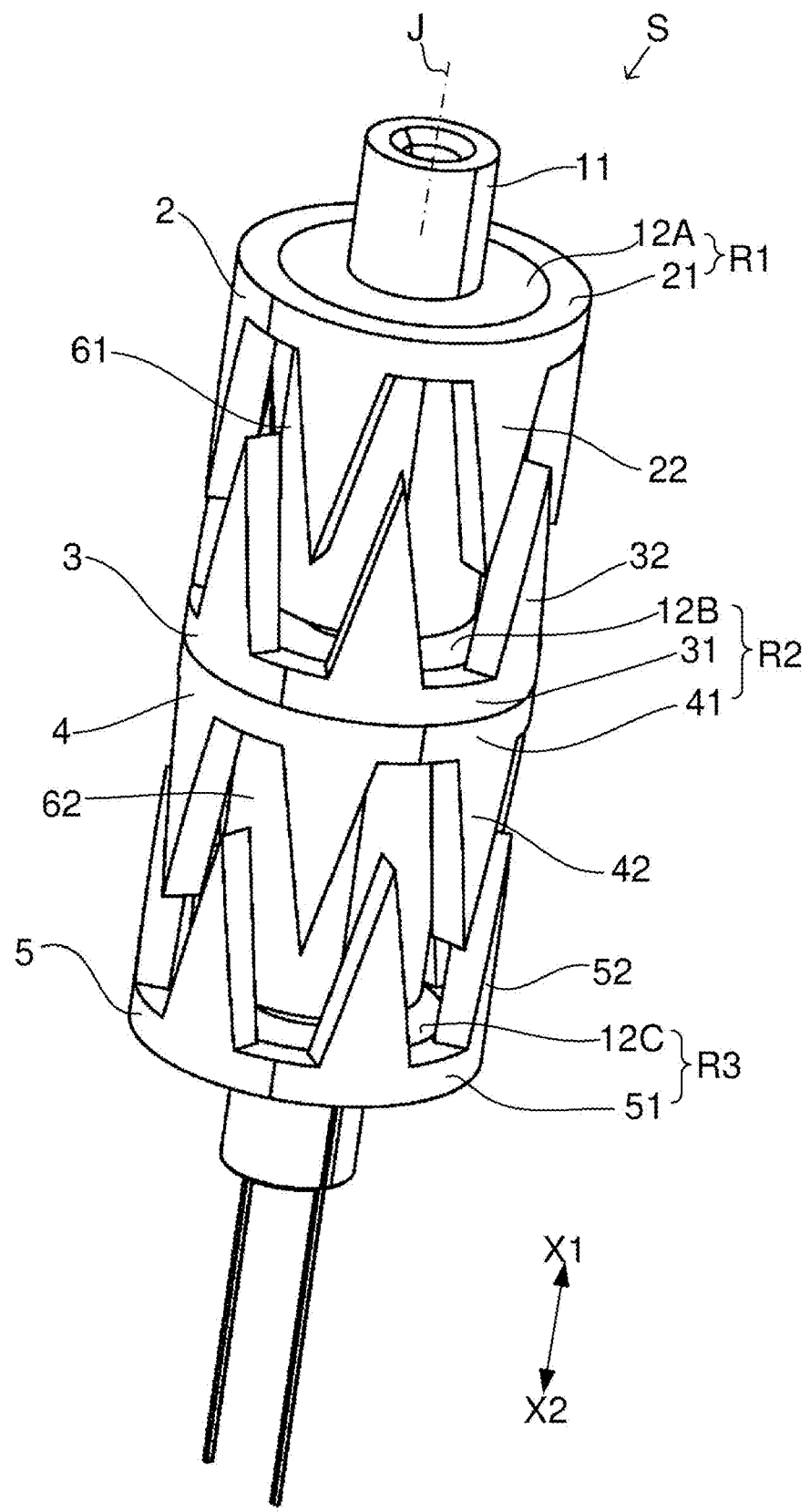

[Fig.3]
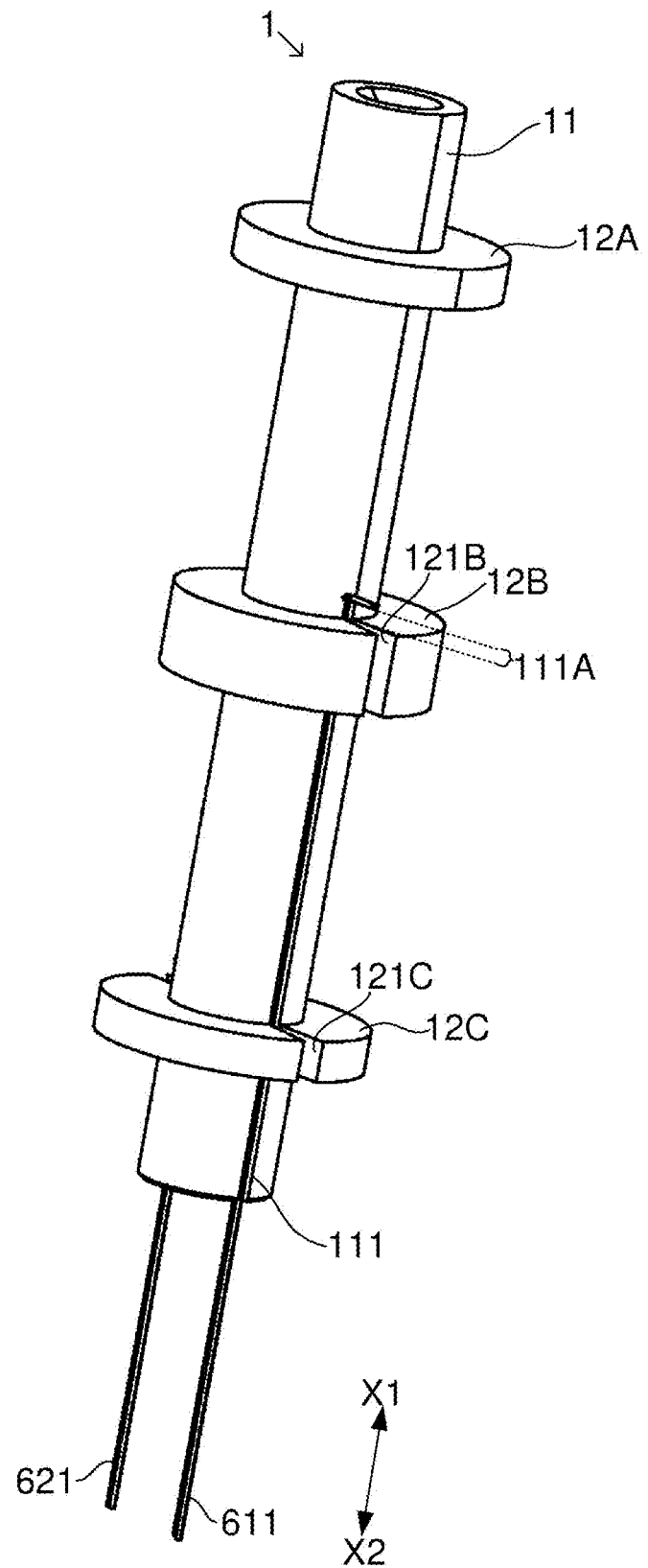

[Fig.4]
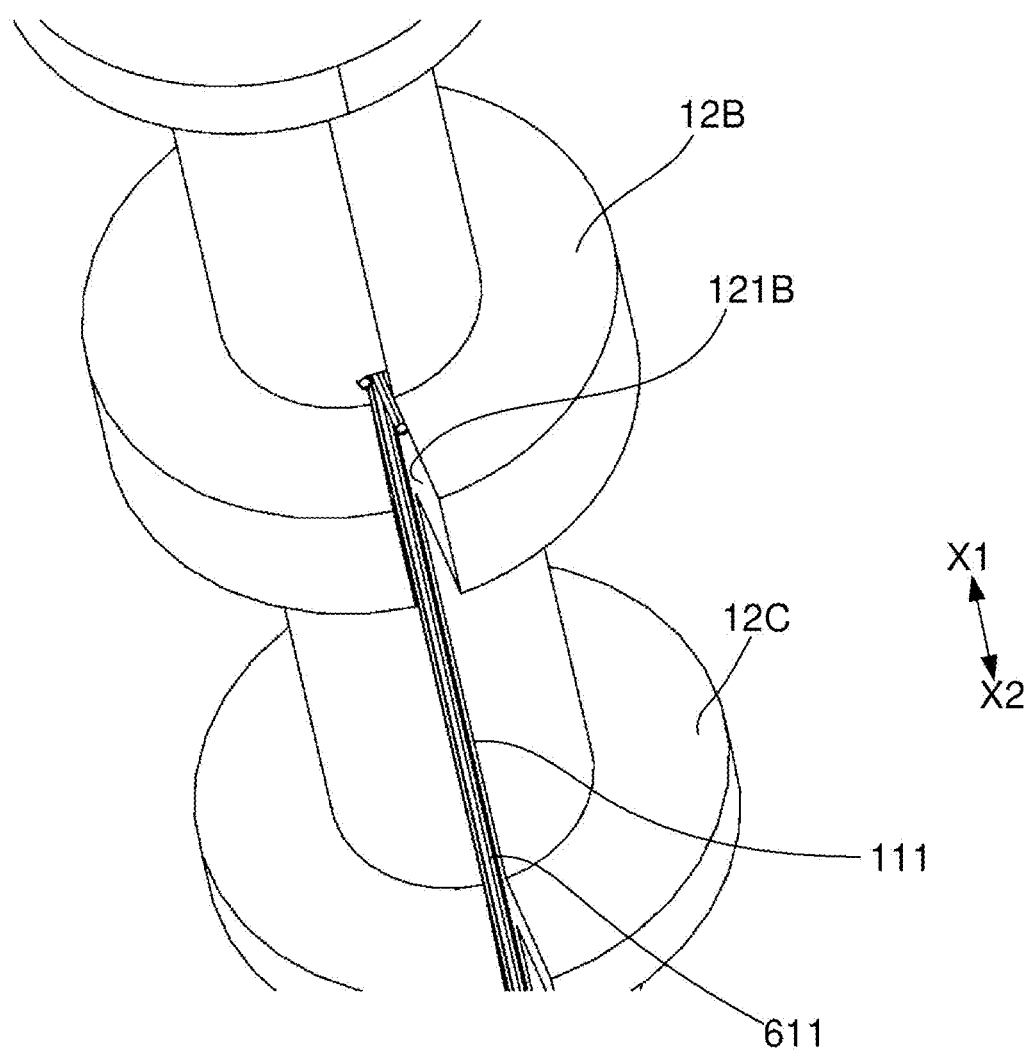

[Fig.5]
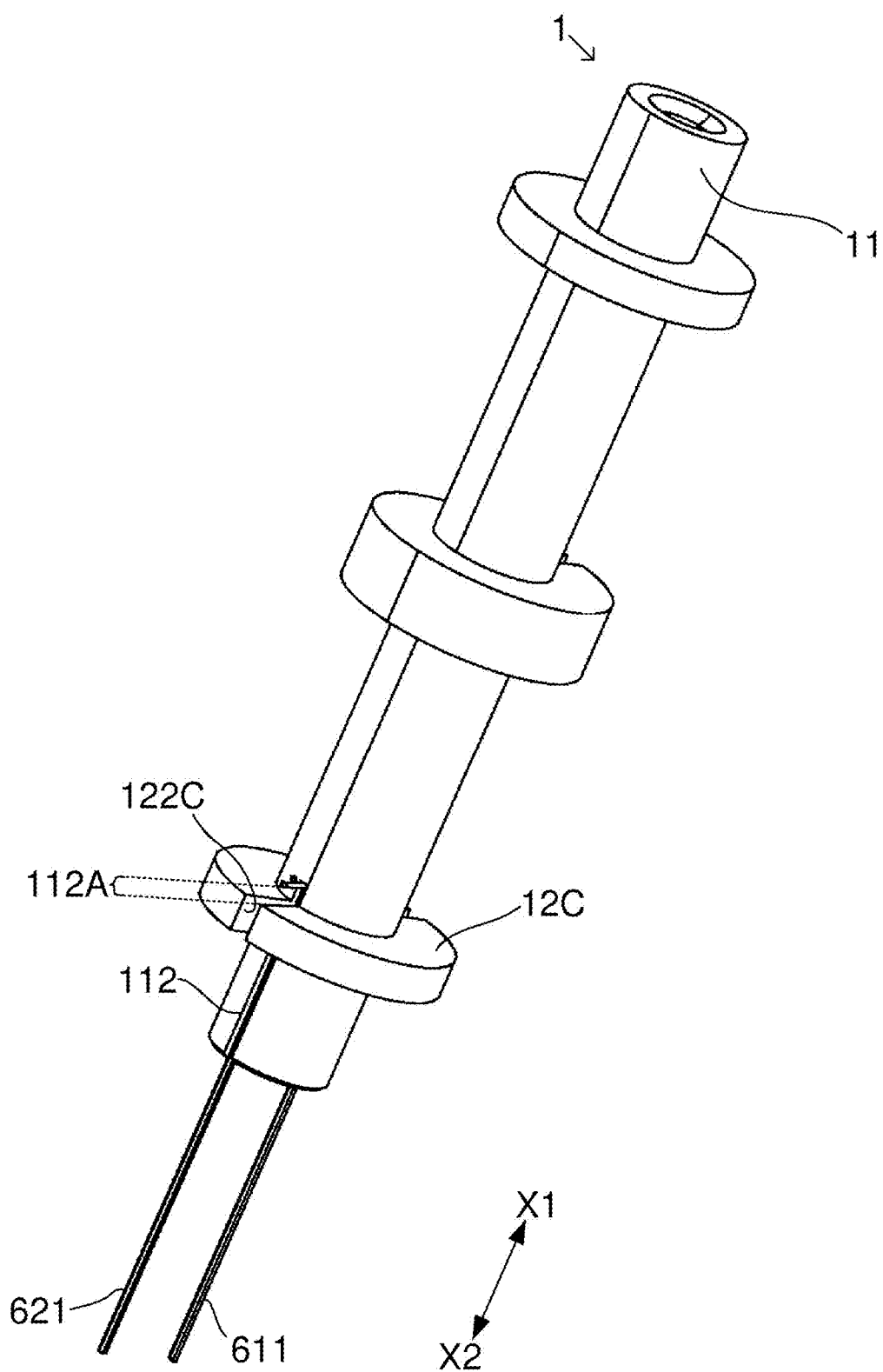

[Fig.6]
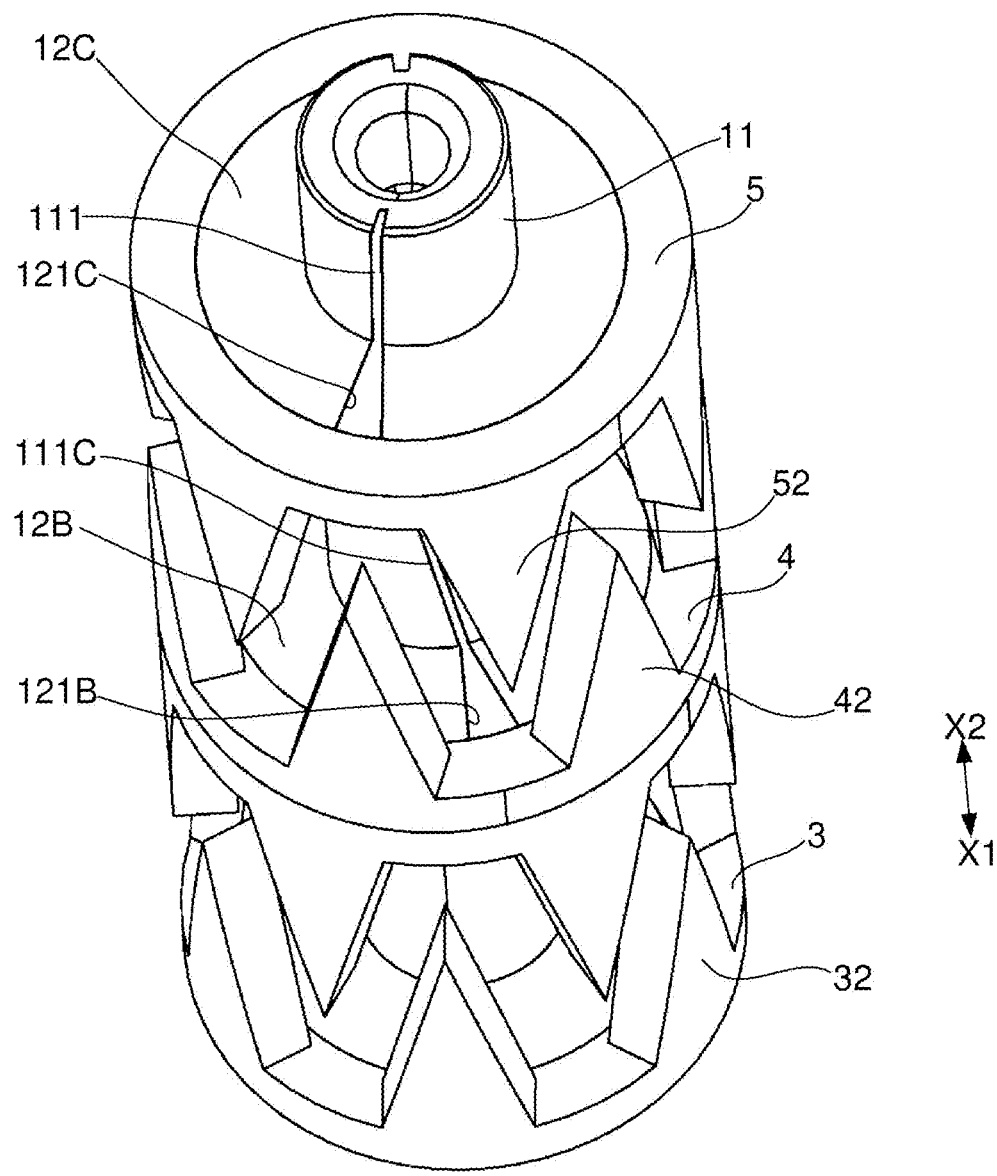

[Fig.7]
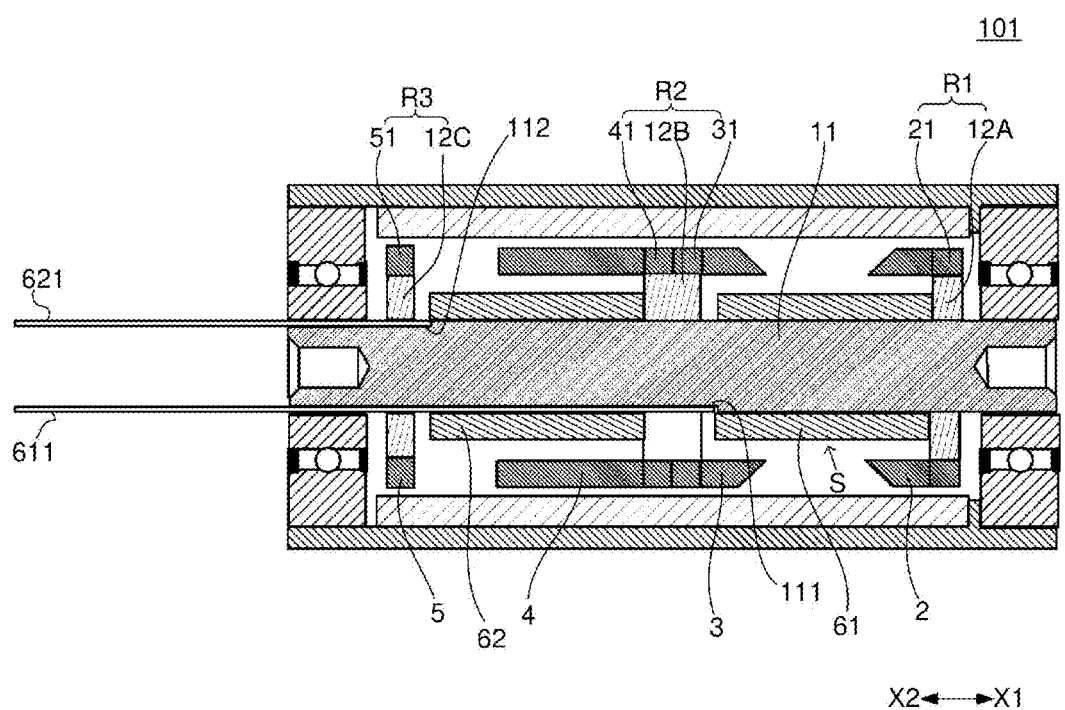

STATOR AND MOTOR

CROSS-REFERENCE TO RELATED APPLICATIONS

The present application claims priority under 35 U.S.C. § 119 to Japanese Patent Application No. 2021-006981, filed on Jan. 20, 2021, the entire contents of which are hereby incorporated herein by reference.

FIELD OF THE INVENTION

The present disclosure relates to a stator used in a stepping motor.

BACKGROUND

Conventionally, a stepping motor includes a motor called a claw-pole motor. The claw-pole motor has a stator. The stator includes a stator core. The stator core has a plurality of claw-shaped pole teeth (claw poles) arranged in the circumferential direction.

The stator in the claw-pole motor as described above includes a coil arranged between a pair of the stator cores. In a case where the motor is of an outer rotor type, when a lead wire from a coil is provided outside the stator, the lead wire may have come into contact with the rotor.

SUMMARY

A stator according to an example embodiment of the present disclosure includes a cylindrical shaft extending in an axial direction, annular portions positioned side by side in the axial direction radially outside the shaft and extending in a radial direction, pole teeth extending in the axial direction from a radially outer end portion of each of the annular portions, and one or more coils between the annular portions adjacent to each other in the axial direction and wound around the shaft.

The shaft includes one or more slits recessed radially inward from an outer peripheral surface of the shaft and extending along the axial direction.

A portion of the slit is radially inside the annular portion.

A lead wire of the coil is in the slit.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a longitudinal cross-sectional view of a motor according to an example embodiment of the present disclosure.

FIG. 2 is a perspective view of a stator according to an example embodiment of the present disclosure.

FIG. 3 is a perspective view illustrating a sleeve and a lead wire according to an example embodiment of the present disclosure.

FIG. 4 is an enlarged perspective view illustrating a configuration in the vicinity of a disk portion 12B in FIG. 3.

FIG. 5 is a perspective view of FIG. 3 as viewed from a different direction.

FIG. 6 is a perspective view of a partial configuration of the stator according to a variation of an example embodiment of the present disclosure as viewed from a second side in an axial direction.

FIG. 7 is a longitudinal cross-sectional view of the motor having the stator according to a variation of an example embodiment of the present disclosure.

DETAILED DESCRIPTION

Example embodiments of the present disclosure will be described with reference to the drawings.

In the present description, in a motor 10, the direction parallel to a central axis J of the motor 10 is referred to as the "axial direction". Note that, in the drawings, the "first side in the axial direction" is denoted by X1 and the "second side in the axial direction" is denoted by X2. Further, in the motor 10, the direction around the central axis J is referred to as the "circumferential direction". In the motor 10, the radial direction with respect to the central axis J is simply referred to as the "radial direction", the direction approaching the central axis J is referred to as the "radially inward", and the direction away from the central axis J is referred to as the "radially outward".

Since a central axis of a stator S described later coincides with the central axis J of the motor 10, reference to directions for the stator S is the same as the above.

FIG. 1 is a longitudinal cross-sectional view of the motor 10 according to an example embodiment of the present disclosure.

The motor 10 is a claw-pole stepping motor and also is an outer rotor motor. The motor 10 includes the stator S, bearings 7A and 7B, and a rotor 8. The rotor 8 is arranged radially outside the stator S.

The stator S includes a sleeve 1, stator cores 2, 3, 4, and 5, and coils 61 and 62. The sleeve 1 is a member extending in the axial direction and is made from a magnetic material. The stator core 2 is fixed to the first side in the axial direction of the sleeve 1. The stator cores 3 and 4 are adjacent to each other in contact with each other in the axial direction, and are fixed to the middle in the axial direction of the sleeve 1. The stator core 5 is fixed to the second side in the axial direction of the sleeve 1.

The stator core 2 has a plurality of pole teeth arranged in the circumferential direction and extending to the second side in the axial direction. The stator core 3 has a plurality of pole teeth arranged in the circumferential direction and extending to the first side in the axial direction. The stator core 4 has a plurality of pole teeth arranged in the circumferential direction and extending to the second side in the axial direction. The stator core 5 has a plurality of pole teeth arranged in the circumferential direction and extending to the first side in the axial direction.

The coils 61 and 62 are formed in a manner that a conductive wire is wound around the outer periphery of the sleeve 1 and are arranged in the axial direction. The coil 61 is arranged on the first side in the axial direction of the coil 62. The coil 61 faces the pole teeth in the radial direction radially inside the pole teeth of the stator cores 2 and 3. The coil 62 faces the pole teeth in the radial direction radially inside the pole teeth of the stator cores 4 and 5.

The bearing 7A is fixed to the outer periphery of an end portion on the first side in the axial direction of the sleeve 1. The bearing 7A is a ball bearing. The bearing 7B is fixed to the outer periphery of an end portion on the second side in the axial direction of the sleeve 1. The bearing 7B is a ball bearing.

The rotor 8 has a housing 81 and a magnet 82. The housing 81 has a cylindrical shape extending in the axial direction about the central axis J. An end portion on the first side in the axial direction of an inner peripheral surface of the housing 81 is fixed to an outer peripheral surface of the bearing 7A. An end portion on the second side in the axial direction of the inner peripheral surface of the housing 81 is fixed to an outer peripheral surface of the bearing 7B.

The magnet 82 has a cylindrical shape extending in the axial direction about the central axis J. The magnet 82 is a permanent magnet, and is composed of, for example, a ferrite magnet. The magnet 82 is fixed to a radially inner peripheral surface of the housing 81. The magnet 82 is arranged between the bearing 7A and the bearing 7B in the axial direction. The magnet 82 radially faces the stator cores 2, 3, 4, and 5 in the radial direction radially outside the stator cores 2, 3, 4, and 5.

As illustrated in FIG. 2 described later, pole teeth 22 of the stator core 2 and pole teeth 32 of the stator core 3 are alternately arranged in the circumferential direction as viewed in the axial direction. Further, pole teeth 42 of the stator core 4 and pole teeth 52 of the stator core 5 are alternately arranged in the circumferential direction as viewed in the axial direction. As the coils 61 and 62 are energized, in each of a pair of the stator cores 2 and 3 and a pair of the stator cores 4 and 5, a plurality of pole teeth arranged in the circumferential direction as viewed in the axial direction are alternately magnetized in the circumferential direction with the N pole and the S pole. The rotor 8 rotates in the circumferential direction by the action of the pole teeth magnetized in this way and the magnet 82.

The configuration of the stator S will be described in detail. Here, reference is made to FIG. 2 in addition to FIG. 1. FIG. 2 is a perspective view of the stator S.

The sleeve 1 includes a shaft 11 and disk portions 12A, 12B, and 12C. The shaft 11 and the disk portions 12A, 12B, and 12C constitute the sleeve 1 which is the same member. That is, the sleeve 1 is formed by integral molding.

The shaft 11 has a columnar shape extending in the axial direction. Each of the disk portions 12A, 12B, and 12C is formed to extend radially outward from the outer periphery of the shaft 11. The disk portions 12A, 12B, and 12C are arranged side by side in the axial direction.

The stator core 2 includes an annular core portion 21 having an annular shape and a plurality of the pole teeth 22. The pole teeth 22 extend from an end on the second side in the axial direction of the annular core portion 21 toward the other side in the axial direction. The annular core portion 21 is fixed to the outer periphery of the disk portion 12A. The disk portion 12A and the annular core portion 21 constitute an annular portion R1 (FIG. 2).

The stator core 3 includes an annular core portion 31 having an annular shape and a plurality of the pole teeth 32. The pole teeth 32 extend from an end on the first side in the axial direction of the annular core portion 31 toward the one side in the axial direction. The annular core portion 31 is fixed to the outer periphery of the disk portion 12B.

The stator core 4 includes an annular core portion 41 having an annular shape and a plurality of the pole teeth 42. The pole teeth 42 extend from an end on the second side in the axial direction of the annular core portion 41 toward the other side in the axial direction. The annular core portion 41 is fixed to the outer periphery of the disk portion 12B on the second side in the axial direction of the annular core portion 31. The annular core portion 31 and the annular core portion 41 are in contact with each other in the axial direction.

The disk portion 12B, the annular core portion 31, and the annular core portion 41 constitute an annular portion R2 (FIG. 2).

The stator core 5 includes an annular core portion 51 having an annular shape and a plurality of the pole teeth 52.

The pole teeth 52 extend from an end on the first side in the axial direction of the annular core portion 51 toward the one side in the axial direction. The annular core portion 51 is fixed to the outer periphery of the disk portion 12C. The disk portion 12C and the annular core portion 51 constitute an annular portion R3 (FIG. 2).

That is, the stator S has a plurality of the annular portions R1, R2, and R3 arranged side by side in the axial direction radially outside the shaft 11 and expanding in the radial direction. Further, the stator S has a plurality of the pole teeth 22, 32, 42, and 52 extending in the axial direction from a radially outer end portion of a plurality of the annular portions R1, R2, and R3.

The coil 61 is arranged between the disk portion 12A and the disk portion 12B in the axial direction, and is wound around the outer periphery of the shaft 11. The coil 62 is arranged between the disk portion 12B and the disk portion 12C in the axial direction, and is wound around the outer periphery of the shaft 11.

That is, the stator S includes one or more of the coils 61 and 62 arranged between the annular portions R1, R2, and R3 adjacent to each other in the axial direction and wound around the shaft 11.

The shaft 11 is provided with a slit as described below, and a configuration related to the slit will be described in detail here.

FIG. 3 is a perspective view mainly illustrating the sleeve 1 and lead wires 611 and 621. As illustrated in FIG. 3, the shaft 11 is provided with a slit 111 that is recessed radially inward from an outer peripheral surface of the shaft 11 and extends along the axial direction. The slit 111 extends from a position on the first side in the axial direction of the disk portion 12B to an end on the second side in the axial direction of the shaft 11.

FIG. 4 is an enlarged perspective view mainly illustrating a configuration in the vicinity of the disk portion 12B in FIG. 3. As illustrated in FIGS. 3 and 4, the disk portion 12B has a notch portion 121B notched in the radial direction from an outer peripheral surface to an inner peripheral surface of the disk portion 12B. A part of the slit 111 is arranged radially inside the notch portion 121B.

Similarly, the disk portion 12C has a notch portion 121C notched in the radial direction from an outer peripheral surface to an inner peripheral surface of the disk portion 12C (FIG. 3). A part of the slit 111 is arranged radially inside the notch portion 121C.

In this manner, at the time the stator S is manufactured, after the coil 61 is formed, the lead wire 611 drawn out from the coil 61 can be caused to pass through the notch portions 121B and 121C from the radially outside to the radially inside so as to be accommodated in the slit 111. Note that two of the lead wires 611 are also accommodated in the slit 111.

FIG. 5 is a perspective view of FIG. 3 as viewed from a different direction. As illustrated in FIG. 5, the shaft 11 is provided with a slit 112 that is recessed radially inward from an outer peripheral surface of the shaft 11 and extends along the axial direction. The slit 112 is at a circumferential position different from that of the slit 111. The slit 112 extends from a position slightly closer to the first side in the axial direction of the disk portion 12C to an end on the second side in the axial direction of the shaft 11.

The disk portion 12C has a notch portion 122C notched in the radial direction from an outer peripheral surface to an inner peripheral surface of the disk portion 12C. The notch portion 122C is at a circumferential position different from that of the notch portion 121C. A part of the slit 112 is arranged radially inside the notch portion 122C.

In this manner, at the time the stator S is manufactured, after the coil 62 is formed, the lead wire 621 drawn out from the coil 62 can be caused to pass through the notch portion 122C from the radially outside to the radially inside so as to be accommodated in the slit 112. Note that two of the lead wires 621 are also accommodated in the slit 112.

As described above, in the present example embodiment, the shaft 11 has one or more of the slits 111 and 112 that are recessed radially inward from the outer peripheral surface of the shaft 11 and extend along the axial direction. A part of the slit 111 and 112 is arranged radially inside the annular portions R2 and R3. The lead wires 611 and 621 of the coils 61 and 62 are accommodated in the slits 111 and 112.

According to this, even in a case where the annular portions R2 and R3 supporting the pole teeth 32, 42, and 52 are provided, the lead wires 611 and 621 of the coils 61 and 62 can be accommodated in the slits 111 and 112 while being arranged radially inside the annular portions R2 and R3 without detouring around the radially outside of the annular portions R2 and R3. Therefore, it is not necessary to provide the lead wires 611 and 621 outside the stator S, and it is possible to suppress the contact of the lead wires 611 and 621 with the rotor 8 arranged radially outside the stator S.

The disk portions 12B and 12C can also be regarded as an inner annular portion which is a part of the radially inner side of the annular portions R2 and R3. In this case, the inner annular portion has the notch portions 121B, 121C, and 122C extending from a radially outer end to a radially inner end of the inner annular portion. The radially inner ends of the notch portions 121B, 121C, and 122C overlap a part of the slits 111 and 112 in the circumferential direction.

In this manner, even in a case where the inner annular portion (12B and 12C) and the shaft 11 constitute the same member in order to improve assembly workability, the lead wires 611 and 621 can be accommodated in the slits 111 and 112 via the notch portions 121B, 121C, and 122C, so that wiring workability is improved.

As illustrated in the configuration of the notch portion 121B in FIG. 4, the circumferential widths of the notch portions 121B, 121C, and 122C decrease from radially outer ends toward radially inner ends of the notch portions 121B, 121C, and 122C. By the above configuration, the lead wires 611 and 621 can be easily inserted into the notch portions 121B, 121C, and 122C.

One or more of the coils 61 and 62 are a plurality of coils. One or more of the slits 111 and 112 are a plurality of slits. Circumferential positions of a plurality of the slits 111 and 112 are different from each other. In this manner, since the lead wires 611 and 621 of a plurality of the coils 61 and 62 can be accommodated in the separate slits 111 and 112, wiring workability can be improved. That is, the workability is improved as compared with the work of accommodating four in total of the lead wires 611 and 621 in one slit.

As illustrated in FIGS. 3 and 5, the slits 111 and 112 have slit portions 111A and 112A extending between an end portion on the second side in the axial direction of the coils 61 and 62 from which the lead wires 611 and 621 are drawn out and the disk portions 12B and 12C. That is, the slits 111 and 112 have the slit portions 111A and 112A extending between axial end portions of the coils 61 and 62 from which the lead wires 611 and 621 are drawn out and the annular portions R2 and R3. In this manner, the lead wire in a location where the lead wires 611 and 621 are drawn out from the coils 61 and 62 can be accommodated in the slits 111 and 112.

At the time the stator S is manufactured, the coil 61 is first formed around the shaft 11, and the lead wire 611 is accommodated in the slit 111. After the above, a conductive wire is wound from the radially outside of the slit 111 to form the coil 62. In this manner, as in the configuration illustrated in FIG. 1, one or more coils include the first coil 61 and the second coil 62 adjacent to each other in the axial direction, and the lead wire 611 of the first coil 61 is arranged radially inside the second coil 62. In this manner, it is possible to suppress the lead wire 611 of the first coil 61 from jumping out radially outward from the slit 111.

As illustrated in FIG. 1, an inner peripheral surface of the bearing 7B is in contact with an outer peripheral surface of an end portion on the second side in the axial direction of the shaft 11. The bearing 7B connects the shaft 11 and the rotor 8. The slits 111 and 112 have slit portions 111B and 112B extending over the entire axial area of the bearing 7B. In this manner, the lead wires 611 and 621 can be drawn out to the outside through the slit portions 111B and 112B located radially inside the bearing 7B.

In the above-described example embodiment, as illustrated in FIG. 3, the circumferential positions of the notch portions 121B and 121C coincide with each other. However, the circumferential positions do not need to coincide with each other as described below.

FIG. 6 is a perspective view of a partial configuration of the stator S according to a variation as viewed from the second side in the axial direction. As illustrated in FIG. 6, when viewed in the axial direction, the circumferential positions of the notch portions 121B and 121C are arranged between the pole teeth 42 and 52 adjacent to each other in the circumferential direction. In this manner, it is possible to suppress hinderance to a magnetic flux flowing through the pole teeth 42 and 52 via the shaft 11 and the annular portions R2 and R3 by the notch portions 121B and 121C.

Because of the circumferential positions of the notch portions 121B and 121C as described above, the circumferential positions of the notch portions 121B and 121C are different. Here, as illustrated in FIG. 6, the slit 111 has a slit portion 111C extending in a direction having an axial component and a circumferential component between the notch portions 121B and 121C arranged in the axial direction. That is, the slit portion 111C extends so as to approach more from the notch portion 121B to 121C in the circumferential direction toward the second side in the axial direction. In this manner, even if the circumferential positions of the notch portions 121B and 121C arranged in the axial direction are different, the lead wire 611 can be accommodated in the slit 111 from the radially inside of the notch portion 121B to the radially inside of the other notch portion 121C which are arranged in the axial direction.

FIG. 7 is a longitudinal cross-sectional view of a motor 101 having the stator S according to a variation. In the stator S according to the variation illustrated in FIG. 7, the disk portions 12A, 12B, and 12C are separate from the shaft 11. That is, the annular portions R1, R2, and R3 are separate from the shaft 11.

At the time the stator S is manufactured having such a configuration, the coil 61 is first formed around the shaft 11, and the lead wire 611 drawn out from the coil 61 is accommodated in the slit 111. After the above, the disk portion 12B is fitted into the shaft 11 from the second side in the axial direction, and the disk portion 12B is arranged at a predetermined position in the axial direction. After the above, the coil 62 is formed around the shaft 11, and the lead wire 621 drawn out from the coil 62 is accommodated in the slit 112. After the above, the disk portion 12C is fitted into the shaft 11 from the second side in the axial direction, and the disk portion 12C is arranged at a predetermined position in the axial direction.

In this manner, as illustrated in FIG. 7, a part of the lead wires 611 and 621 is arranged radially inside the disk portions 12B and 12C. That is, the lead wires 611 and 621 are arranged between a part of the slits 111 and 112 and radially inner ends of the annular portions R2 and R3. In this manner, the annular portions R2 and R3 can suppress the lead wires 611 and 621 from jumping out of the slits 111 and 112 to the radially outward.

The disk portions 12A, 12B, and 12C and the stator cores 2, 3, 4, and 5 may be integrally formed to constitute one stator core. In this case, three stator cores to be constituted and the shaft 11 are separate from each other.

The present disclosure can be used for stepping motors used in various devices.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator comprising:
   a cylindrical shaft extending in an axial direction;
   annular portions positioned side by side in the axial direction radially outside the shaft and extending in a radial direction;
   pole teeth extending in the axial direction from a radially outer end portion of each of the annular portions; and
   one or more coils between the annular portions adjacent to each other in the axial direction and wound around the shaft; wherein
   the shaft includes at least one slit recessed radially inward from an outer peripheral surface of the shaft and extending along the axial direction;
   a portion of the at least one slit is radially inside the annular portion;
   a lead wire of the coil is in the at least one slit;
   the one or more coils include a first coil and a second coil adjacent to each other in the axial direction; and
   the lead wire of the first coil is radially inside the second coil.

2. The stator according to claim 1, wherein the at least one slit includes a first slit portion extending between an axial end portion of the coil from which the lead wire is drawn out and the annular portion.

3. The stator according to claim 1, wherein
   the one or more coils include multiple coils;
   the at least one slit includes multiple slits; and
   circumferential positions of the multiple slits are different from each other.

4. The stator according to claim 1, wherein
   an inner annular portion that is a portion of a radially inner side of the annular portion defines a single monolithic structure together with the shaft;
   the inner annular portion includes a notch portion extending from a radially outer end of the inner annular portion to a radially inner end of the inner annular portion; and
   a radially inner end of the notch portion overlaps the portion of the at least one slit in a circumferential direction.

5. The stator according to claim 4, wherein a circumferential width of the notch portion decreases from a radially outer end of the notch portion toward a radially inner end of the notch portion.

6. The stator according to claim 4, wherein when viewed in the axial direction, a circumferential position of the notch portion is between the pole teeth that are adjacent to each other in the circumferential direction.

7. The stator according to claim 6, wherein the at least one slit includes a second slit portion extending in a direction having an axial component and a circumferential component between the notch portions.

8. The stator according to claim 1, wherein
   at least one of the annular portions is separate from the shaft; and
   the lead wire is between the portion of the at least one slit and a radially inner end of the at least one of the annular portions.

9. A motor comprising:
   the stator according to claim 1; and
   a rotor radially outside the stator.

10. The motor according to claim 9, further comprising:
    a bearing that connects the shaft and the rotor; wherein
    the at least one slit includes a third slit portion extending over an entire axial dimension of the bearing.

11. A stator comprising:
    a cylindrical shaft extending in an axial direction;
    annular portions positioned side by side in the axial direction radially outside the shaft and extending in a radial direction;
    pole teeth extending in the axial direction from a radially outer end portion of each of the annular portions; and
    one or more coils between the annular portions adjacent to each other in the axial direction and wound around the shaft; wherein
    the shaft includes at least one slit recessed radially inward from an outer peripheral surface of the shaft and extending along the axial direction;
    a portion of the at least one slit is radially inside the annular portion; and
    a lead wire of the coil is in the at least one slit; wherein
    an inner annular portion that is a portion of a radially inner side of the annular portion defines a single monolithic structure together with the shaft;
    the inner annular portion includes a notch portion extending from a radially outer end of the inner annular portion to a radially inner end of the inner annular portion; and
    a radially inner end of the notch portion overlaps the portion of the at least one slit in a circumferential direction.

12. The stator according to claim 11, wherein
    the at least one slit includes a first slit portion extending between an axial end portion of the coil from which the lead wire is drawn out and the annular portion.

13. The stator according to claim 11, wherein
    a circumferential width of the notch portion decreases from a radially outer end of the notch portion toward a radially inner end of the notch portion.

14. The stator according to claim 11, wherein
    when viewed in the axial direction, a circumferential position of the notch portion is between the pole teeth that are adjacent to each other in the circumferential direction; wherein
    the at least one slit includes a second slit portion extending in a direction having an axial component and a circumferential component between the notch portions.

15. The stator according to claim 11, wherein
at least one of the annular portions is separate from the shaft; and
the lead wire is between the portion of the at least one slit and a radially inner end of the at least one of the annular portions.

16. A motor comprising:
the stator according to claim 11; and
a rotor radially outside the stator.

17. The motor according to claim 16, further comprising:
a bearing that connects the shaft and the rotor; wherein
the at least one slit includes a third slit portion extending over an entire axial dimension of the bearing.

18. A stator comprising:
a cylindrical shaft extending in an axial direction;
annular portions positioned side by side in the axial direction radially outside the shaft and extending in a radial direction;
pole teeth extending in the axial direction from a radially outer end portion of each of the annular portions; and
one or more coils between the annular portions adjacent to each other in the axial direction and wound around the shaft; wherein
the shaft includes at least one slit recessed radially inward from an outer peripheral surface of the shaft and extending along the axial direction;
a portion of the at least one slit is radially inside the annular portion; and
a lead wire of the coil is in the at least one slit; wherein
at least one of the annular portions is separate from the shaft; and
the lead wire is between the portion of the at least one slit and a radially inner end of the at least one of the annular portions.

19. The stator according to claim 18, wherein
the at least one slit includes a first slit portion extending between an axial end portion of the coil from which the lead wire is drawn out and the annular portion.

20. A motor comprising:
the stator according to claim 18; and
a rotor radially outside the stator;
the motor further comprising:
a bearing that connects the shaft and the rotor; wherein
the at least one slit includes a third slit portion extending over an entire axial dimension of the bearing.

\* \* \* \* \*